US008272749B2

(12) United States Patent
Yoon

(10) Patent No.: US 8,272,749 B2
(45) Date of Patent: Sep. 25, 2012

(54) HIGH RESOLUTION SEGMENTED 3D PROJECTION SYSTEM

(75) Inventor: Youngshik Yoon, Valencia, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 345 days.

(21) Appl. No.: 12/450,683

(22) PCT Filed: Apr. 25, 2007

(86) PCT No.: PCT/US2007/009979
§ 371 (c)(1),
(2), (4) Date: Oct. 6, 2009

(87) PCT Pub. No.: WO2008/133611
PCT Pub. Date: Nov. 6, 2008

(65) Prior Publication Data
US 2011/0013143 A1 Jan. 20, 2011

(51) Int. Cl.
*G03B 21/28* (2006.01)
*G03B 21/14* (2006.01)
*H04N 5/74* (2006.01)
*G02F 1/00* (2006.01)
(52) U.S. Cl. ............... 353/81; 353/20; 353/98; 353/99; 353/121; 348/771; 348/752; 348/767
(58) Field of Classification Search .................. 353/20, 353/98, 99, 121, 81; 348/771, 752, 767
See application file for complete search history.

(56) References Cited

U.S. PATENT DOCUMENTS

| 3,704,061 | A | 11/1972 | Travis |
| 5,517,340 | A | 5/1996 | Doany et al. |
| 5,555,035 | A | 9/1996 | Mead et al. |
| 5,903,304 | A | 5/1999 | Deter |
| 6,250,763 | B1 | 6/2001 | Fielding et al. |
| 6,266,105 | B1 | 7/2001 | Gleckman |
| 6,515,734 | B1 | 2/2003 | Yamada et al. |
| 6,644,813 | B1 | 11/2003 | Bowron |
| 6,648,475 | B1 | 11/2003 | Roddy et al. |
| 6,799,851 | B2 | 10/2004 | Yoon |
| 6,863,400 | B1 | 3/2005 | Liang |
| 7,230,656 | B2 | 6/2007 | Penn et al. |
| 7,386,125 | B2 | 6/2008 | Bilobrov et al. |

(Continued)

FOREIGN PATENT DOCUMENTS

CN 1424623 A 6/2003

(Continued)

OTHER PUBLICATIONS

International Search Report, dated Jun. 30, 2008.

*Primary Examiner* — Georgia Y Epps
*Assistant Examiner* — Magda Cruz
(74) *Attorney, Agent, or Firm* — Robert D. Shedd; Harvey D. Fried; Richard LaPeruta

(57) ABSTRACT

A high resolution 3D projection system having a light source (302) for generating and emitting light, a translucent rotatable drum (308) having differently polarized sections for receiving the light therethrough, a plurality of digital micromirror device imagers (324, 326, 328 and 330) configured to receive and reflect the light transmitted through the drum (308), where a light beam is capable of being passed generally orthogonally through a wall of the drum is disclosed.

18 Claims, 3 Drawing Sheets

U.S. PATENT DOCUMENTS

| | | |
|---|---|---|
| 7,862,182 B2 | 1/2011 | Thollot et al. |
| 2001/0024268 A1 | 9/2001 | Fielding et al. |
| 2002/0008770 A1 | 1/2002 | Ho et al. |
| 2002/0051094 A1 | 5/2002 | Makita |
| 2004/0100589 A1 | 5/2004 | Ben-David et al. |
| 2004/0130682 A1 | 7/2004 | Tomita |
| 2004/0184005 A1 | 9/2004 | Roth |
| 2004/0233342 A1 | 11/2004 | Kim et al. |
| 2005/0088629 A1 | 4/2005 | Greenberg et al. |
| 2005/0162615 A1 | 7/2005 | Penn |
| 2005/0168708 A1 | 8/2005 | Huang |
| 2005/0206846 A1 | 9/2005 | Yeung et al. |
| 2005/0237487 A1 | 10/2005 | Chang |
| 2006/0038964 A1 | 2/2006 | Lu et al. |
| 2006/0039068 A1 | 2/2006 | Tokita et al. |
| 2006/0044525 A1 | 3/2006 | Lee et al. |
| 2006/0152524 A1 | 7/2006 | Miller et al. |
| 2006/0203209 A1 | 9/2006 | De Vaan |
| 2006/0220199 A1 | 10/2006 | Duboc et al. |
| 2006/0290777 A1 | 12/2006 | Iwamoto et al. |
| 2007/0139624 A1 | 6/2007 | DeCusatis et al. |
| 2007/0195275 A1 | 8/2007 | Drazic et al. |
| 2007/0273835 A1 | 11/2007 | Fan et al. |
| 2008/0151354 A1* | 6/2008 | Mehrl .......................... 359/292 |
| 2009/0108182 A1 | 4/2009 | Thiebaud et al. |
| 2009/0140974 A1 | 6/2009 | Maeda |
| 2010/0014008 A1 | 1/2010 | Yoon |
| 2010/0026959 A1* | 2/2010 | Yoon et al. ........................ 353/8 |
| 2010/0104260 A1 | 4/2010 | Yoon et al. |
| 2010/0315596 A1 | 12/2010 | Yoon |
| 2011/0013143 A1 | 1/2011 | Yoon |

FOREIGN PATENT DOCUMENTS

| | | |
|---|---|---|
| DE | 19626097 | 10/1997 |
| EP | 1 220 549 A2 | 7/2002 |
| EP | 1317148 A1 | 6/2003 |
| FR | 2872924 | 1/2006 |
| JP | 8289218 | 1/1996 |
| JP | 10268230 | 10/1998 |
| JP | 11-505334 A | 5/1999 |
| JP | 2002-287247 A2 | 10/2002 |
| JP | 2004-205919 A2 | 7/2004 |
| JP | 2005241904 | 9/2005 |
| JP | 2006-58588 A | 3/2006 |
| JP | 2006-276311 A2 | 10/2006 |
| JP | 2007-017536 A2 | 1/2007 |
| JP | 2007-519372 A | 7/2007 |
| WO | WO9800746 | 1/1998 |
| WO | WO0191471 | 11/2001 |
| WO | WO2004040899 | 5/2004 |
| WO | 2005/074258 A1 | 8/2005 |
| WO | WO2006057001 | 6/2006 |
| WO | WO2006118881 | 11/2006 |

* cited by examiner

HIGH RESOLUTION SEGMENTED 3D PROJECTION SYSTEM

CROSS-REFERENCE TO RELATED APPLICATIONS

This application relates to U.S. Applications 12/448,320 filed on Jun. 17, 2009 which published as US 2010-0014008A1; 12/312,998 filed on Jun. 3, 2009 which published as US 2010-0315596A1; 12/448,002 filed on Jun. 3, 2009 which published as US 2010-0026959A1; and 12/448,338 filed on Jun. 17, 2009 which published as US2010-0026910A1.

FIELD OF THE INVENTION

This application claims the benefit, under 35 U.S.C. §365 of International Application PCT/US2007/009,979, filed 25 Apr. 2007, which was published in accordance with PCT Article 21(2) on 6 Nov. 2008, in English.

The invention relates to a digital micromirror device (DMD) projection system. In particular, the invention relates to a high resolution 3D DMD projection system.

BACKGROUND OF THE INVENTION

With the advent of digital micromirror devices (DMD devices) such as digital light processors (DLPs), there has been a desire to integrate the digital projection technology into cinematic theatres for viewing by the public at large. However, as of yet, DMDs (and DLPs in particular) have not yet progressed in native resolution capability so as to allow an acceptable image for large venues which complies with industry standards for display quality. Particularly, the Society of Motion Picture and Television Engineers (SMPTE) promulgates such standards which are well respected by the various members of the motion picture industry. One such standard applies to the display of Digital Cinema Distribution Masters (DCDMs) (digital packages which contains all of the sound, picture, and data elements needed for a show) in review rooms and theatres. A requirement of the SMPTE standard is that the number of pixels for a projected image must be at least 2048×1080 (2K×1K pixels). The standard further requires that the mesh of pixels (the device structure) must be invisible when viewed from a reference viewing distance. While many DMD/DLP projectors meet the minimum requirement regarding resolution, those same projectors cannot meet the second requirement of the standard because the proper reference viewing distance is small enough to cause visibility of the mesh of pixels. Therefore, current DMD/DLP projectors having 2K×1K resolution which may not be suitable for most commercial theatres where the viewing distance is small, such as an IMAX theatre, and where to prevent the appearance of the pixel mesh from an appropriate viewing distance, a DMD/DLP projector must have a resolution of about 4K×2K (which is not currently commercially available).

A projected two dimensional (2D) image may be enhanced with an appearance of depth by converting the projected image into a so-called three dimensional (3D) image. This, is accomplished by optically polarizing the images which are to be viewed by a viewer's left eye differently than the images which are to be viewed by a viewer's right eye. The 3D effect is perceived by the viewer when the viewer views the polarized images through the use of polarized filter lenses, commonly configured as '3D viewing glasses' with a polarized filter for use with the left eye of the viewer and a differently polarized filter for use with the right eye of the viewer. When the 3D viewing glasses are used to view the 3D images, the left eye of the viewer sees only the light polarized appropriately for passage through the polarized filter associated with the left eye and the right eye of the viewer sees only the light polarized appropriately for passage through the polarized filter associated with the right eye of the viewer. The above described method of displaying 3D images is known as passive 3D viewing where the projector alternates the left eye information with the right eye information at double the typical frame rate and a screen/filter/polarizing blocker in front of the projector's lenses alternates the polarization of the projected image in such a way that the image of each eye passes through the corresponding polarizing filter of the pair of passive stereo glasses discussed above. An alternative to passive 3D viewing is active 3D viewing where each viewer wears glasses with LCD light shutters which work in synchronization with the projector so that when the projector displays the left eye image, the right eye shutter of the active stereo eyewear is closed, and vice versa. One problem with current systems for providing 3D images is that the projectionist must attach and configure an external special device to the standard projector, which is a costly and time consuming requirement which also leads to technical failure. Further, when the projectionist again desires to project only a 2D image, the special device must be manually removed or turned off. In addition, having such a device attached to the projector parallel to the projection lens surface introduces a risk that light will reflect back to the imagers from which the light originates, often causing lower picture quality in color productions and undesirable contrast ratio change in black & white productions. While there are many advanced methods of displaying 3D images, room for improvement remains.

Referring now to FIG. 1, a typical three color prism 100 is shown. Prism 100 is typically used with a three-chip digital micromirror device projector. As shown, a light beam 102 enters prism 100, and in reaction to known optical coating methods, is selectively reflected or transmitted depending on the wavelength of the light. Further, known total internal reflection techniques, such as providing a small air gap between prism 100 components, may be used to control the reflection of the divided components of light beam 100. After having been separated into three color components, each light beam 102 color component is directed to and selectively reflected out of prism 100 by a digital micromirror device. Particularly, digital micromirror device 104 reflects a blue color component of light beam 102, digital micromirror device 106 reflects a green color component of light beam 102, and digital micromirror device 108 reflects a red color component of light beam 102. Each digital micromirror device 104, 106, 108 may be individually controlled in a known manner to produce a combined color image which is projected from prism 100.

It is therefore desirable to develop an improved a projection system capable of displaying high resolution 3D images.

SUMMARY OF THE INVENTION

The present invention is directed to a high resolution 3D projection system having a light source for generating and emitting light, a translucent rotatable drum having differently polarized sections for receiving the light therethrough, a plurality of digital micromirror device imagers configured to receive and reflect the light transmitted through the drum, where a light beam is capable of being passed generally orthogonally through a wall of the drum.

The present invention is also directed to a method for projecting 3D images. The method includes the steps of polarizing a source light beam into first and second light beams having different polarizations and alternating polarities relative to one another; rotatably controlling the polarizing step; splitting the first and second polarized light beams into a plurality of separate channels of light that each have respective third and fourth differently polarized light beams; dividing each of the channels of the respective third and fourth light beams into respective sets of differently colored light beams; illuminating respective imagers With the respective sets of differently colored light beams; and illuminating different regions of a display with the respective imagers. The method can further include in the rotatably controlling step, the steps of defining an annular path having an inwardly directed surface, where the radii of the annular path intersects the surface in a substantially perpendicular manner; defining a polarizing position on the annular path; directing the source light beam toward the polarizing position on the annular path; and rotatably controlling movement along the annular path.

DETAILED DESCRIPTION OF THE INVENTION

Figure 1:
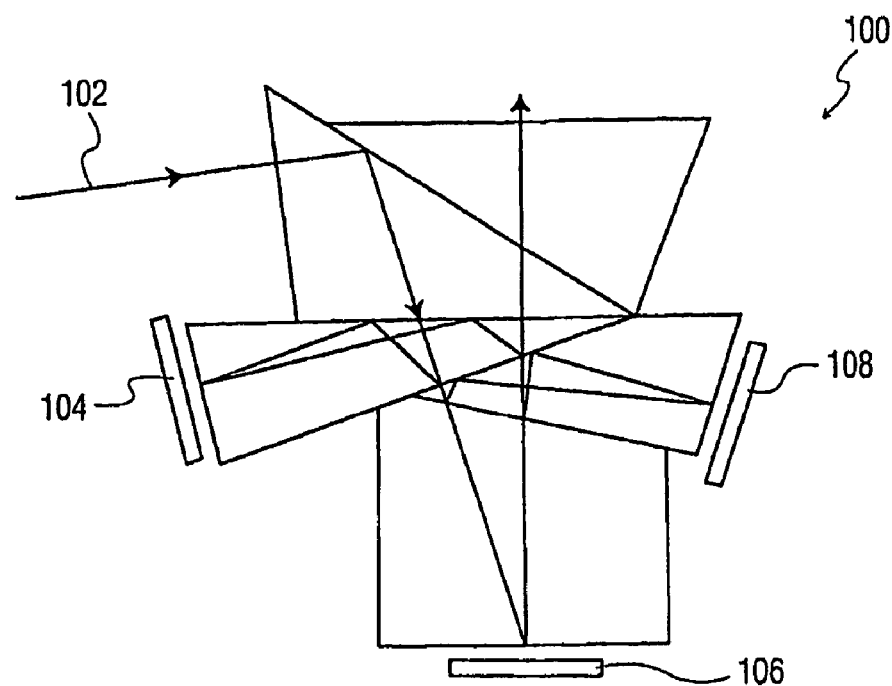
FIG. 1 is a schematic illustration of a three color prism according to the prior art.
Figure 2:
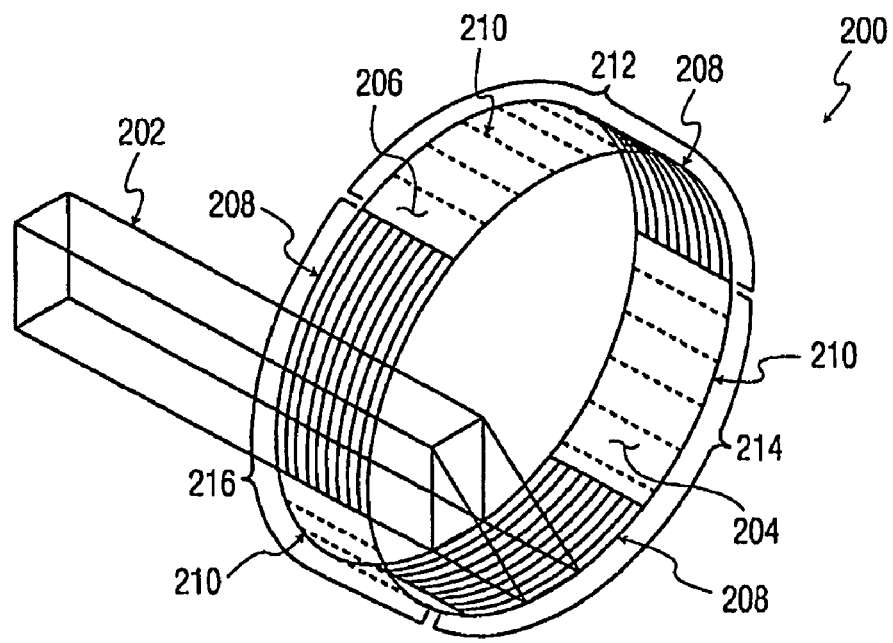
FIG. 2 is an oblique schematic illustration of a polarization drum according to the present invention.

Referring now to FIG. 2 in the drawings, a polarizing drum according to a first embodiment of the present invention is illustrated. Polarizing drum 200 (or otherwise called a polarization hollow cylinder) is a rotatable drum-like structure formed of translucent materials. Drum 200 is shown as a flat band of material (which can have segments that are curved or flat) located in close proximity to a directional light transmission device (or light pipe) 202 for passing light through drum 200 by directing light generally orthogonal to an interior surface 204 of the drum 200 such that light passes through the translucent material and exits the drum 200 through an exterior surface 206 of the drum 200 (through a wall of the) drum). As shown, the drum 200 is divided into radially alternating clockwise circular polarization sections 208 (or P-polarization sections) and counter-clockwise circular polarization sections 210 (or S-polarization sections). In operation, a 2D image can be converted to a 3D image by transmitting the 2D image through the directional light transmission device 202 and subsequently through the polarization drum 200 while drum 200 is rotated about its central axis. The drum 200 is rotated at a controlled speed so as to appropriately polarize each frame of images as either P-polarization or S-polarization by passing the image through sections 208, 210, respectively. Where the drum 200 is to be used with known single-chip type digital micro-mirror device imagers (which can be referred to as "imagers," DMD/DLP imagers, micro-mirror arrays or microdisplay devices and can include functional equivalent devices), the drum 200 can be colored so as to eliminate the need for a separate spinning color wheel. Specifically, the translucent drum 200 can be divided into differently colored sections. For example, drum 200 can comprise a blue section 212, a green section 214, and a red section 216.

Figure 3:
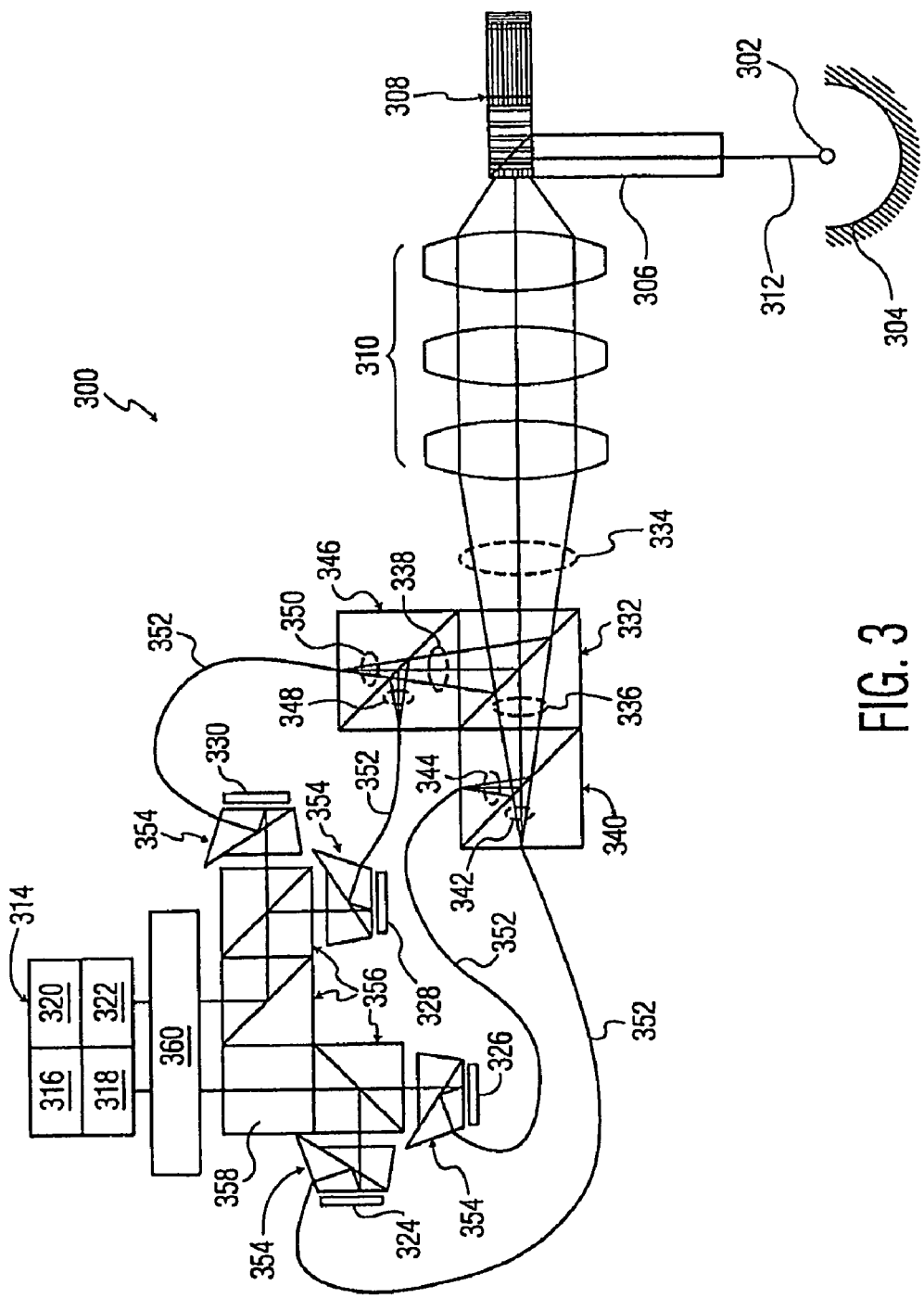
FIG. 3 is an orthogonal schematic illustration of a high resolution 3D projector according to the present invention.

Referring now to FIG. 3 in the drawings, a high resolution 3D projector according to the present invention is illustrated. Projector 300 comprises a light source 302 having a reflector 304, a directional light transmission device 306 similar to device 202, a polarizing drum 308 similar to drum 200, and relay optics 310.

While it is currently thought that a single DMD/DLP imager having resolution of about 2048×1080 (2K×1K) is insufficient for accurately reproducing an entire frame of motion picture image data onto a display surface, high resolution 3D projection system 300 advantageously utilizes a plurality of DMD/DLP imagers (each having resolution of about 2K×1K) to accomplish a total projected image resolution of about 4K×2K, a result acceptable by SMPTE standards. To accomplish this, the entire frame of a target display surface 314 is divided into four regions, an upper left region 316, a lower left region 318, an upper right region 320, and a lower right region 322. Region 316 is to be projected onto by DMD/DLP imager 324, region 318 is to be projected onto by DMD/DLP imager 326, region 320 is to be projected onto by DMD/DLP imager 328, and region 322 is to be projected onto by DMD/DLP imager 330 such that each imager 324, 326, 328, 330 projects only a discrete portion of an entire frame of a motion picture image. In this embodiment, each imager 324, 326, 328, 330 is configured to project a substantially equal area of an entire frame of a motion picture image onto the display surface 314. However, it will be appreciated that in alternative embodiments, the imagers can be configured to project unequal portions of a motion picture image while still providing a high resolution display.

In operation, light source 302 emits white or full spectrum light beam 312. An elliptical reflector 304 can then be employed to guide the light into directional light transmission device 306. The light is then directed into the polarizing drum 308 as polarizing drum 308 rotates about its central axis and the relay optics 310. Since each DMD/DLP imager 324, 326, 328, and 330 must be supplied with light, the light exiting relay optics 310 is separated into four separate beams or channels of light (ideally identical in intensity and color) through the use of light beam splitting prisms. A first light beam splitting prism 332 splits the original light beam 334 into two new light beams 336 and 338. Light beam 336 is directed from prism 332 into a second light beam splitting prism 340, resulting in light beams 342 and 344. Light beam 338 is directed from prism 332 into a third light beam splitting prism 346, resulting in light beams 348 and 350. Each of light beams 342, 344, 348, and 350 are directed into and delivered through optical fibers 352 to total internal reflection lenses (TIR lenses) 354 associated with DMD/DLP imagers 324, 326, 328, and 330, respectively, such that each imager 324, 326, 328, and 330 receives a single beam of light. TIR lenses are suitable for receiving light, directing the received light to a DMD/DLP imager, and finally outputting the light according to an image signal of the DMD/DLP imager. However, it will be appreciated that in an alternative embodiment, the TIR lenses can be replaced by field lenses. TIR lenses 354 are oriented to direct their output into an arrangement of reflective prisms 356 and optical blocks 358 so as to forward the four light beams 342, 344, 348, and 350 (or channels of light) (as altered by DMD/DLP imagers 324, 326, 328, and 330, respectively) into a projection optics system 360. Projection optics system 360 ultimately directs the light beams 342, 344, 348, and 350 onto regions 316, 318, 320, and 322, respectively, of the entire frame of the target display surface 314. The input signals sent from display controllers of DMD/DLP imagers 324, 326, 328, and 330 to the mirrors of the respective DMD/DLP imagers comprise only the data necessary to create the desired image to be projected onto the associated regions of display surface 314. Further, the received beams of light are manipulated by imagers 324, 326, 328, and 330 to carry motion picture image data corresponding to only a discrete portion of an entire motion picture image frame. It will be appreciated that in other embodiments of the present invention, more or fewer DLP imagers can be incorporated to achieve a higher or lower overall film screen resolution, respectively.

The 3D image is perceived by a viewer of the projected image when the viewer wears polarized filter glasses (not shown) which allow only one of the clockwise and counter-clockwise circular polarized (or alternatively, one of the P and S polarized) portions of light through the glasses to each eye of the viewer. The projector should present approximately twice the number of frames per second in 3D mode as opposed to a normal 2D mode since each eye will only see every other frame. Alternatively, the projector can be used as a 2D projector by projecting image data containing only frames to be viewed by both eyes of the viewer simultaneously and by the viewer not wearing polarized filter glasses. Alternatively, the drum 308 can be configured for automated and/or automatic removal of the drum 308 from the light path, resulting in an increase in the output brightness (by as much as a factor of two). Where the colored drum is removed from the light path, a spinning primary color wheel should be introduced into the light path. A single spinning primary color wheel or functional equivalent (for example, the drum 200 shown in FIG. 2 in place of drum 308 in FIG. 3) can be introduced before the original light beam is split, or a plurality of spinning primary color wheels or functional equivalents (not shown) can be associated, one each, with the imagers 324, 326, 328, and 330. In the case where a plurality of spinning primary color wheels or equivalents are employed, color wheels or equivalents can be placed before the TIR lenses 354.

Figure 4:
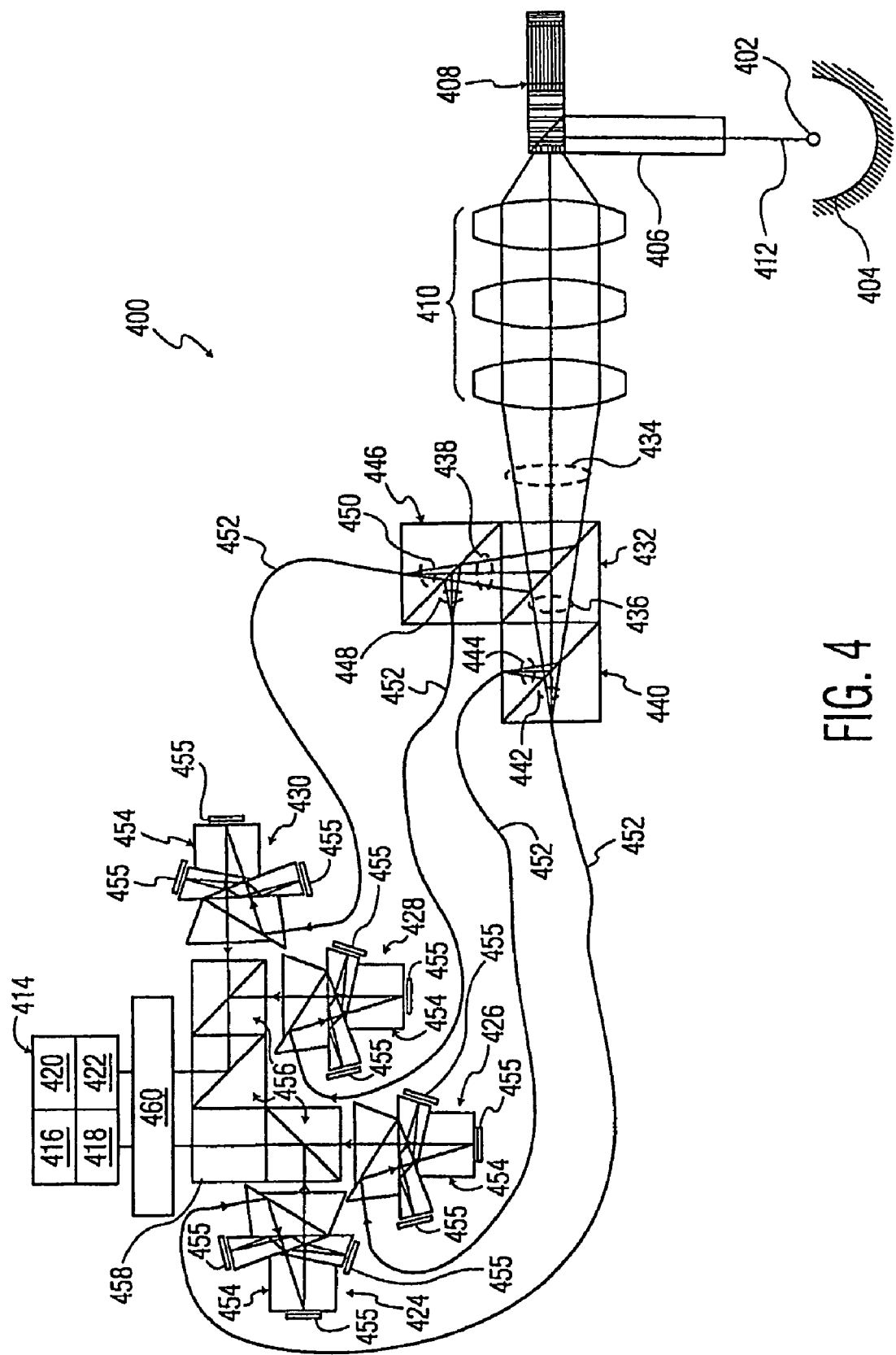
FIG. 4 is an orthogonal schematic illustration of a high resolution high color control 3D projector according to the present invention.

Referring now to FIG. 4 in the drawings, a high resolution high color control 3D projection system according to a second embodiment of the present invention is illustrated. High resolution 3D projection system 400 is similar to system 300 in many ways including the fact that it advantageously utilizes a plurality of DMD/DLP imagers (each having resolution of about 2K×1K) to accomplish a total projected image resolution of about 4K×2K, a result acceptable by SMPTE standards. To accomplish this, the entire frame of a target display surface 414 is divided into four regions, an upper left region 416, a lower left region 418, an upper right region 420, and a lower right region 422. However, system 400 comprises four three-imager sets 424, 426, 428, and 430 each comprising three DMD/DLP imagers 455 instead of four single-imager type imagers (like 324, 326, 328, and 330). Region 416 is to be projected onto by DMD/DLP imager set 424, region 418 is to be projected onto by DMD/DLP imager set 426, region 420 is to be projected onto by DMD/DLP imager set 428, and region 422 is to be projected onto by DMD/DLP imager set 430. Since each DMD/DLP imager of the three-DMD/DLP imager sets 424, 426, 428, 430 consistently manipulates a single color (red, green, or blue) there is no need for drum 408 to be colored (as needed in system 300). Instead, drum 408 is not colored and passes white or full spectrum light therethrough.

In operation, white light or full spectrum light is emitted from a light source 402. An elliptical reflector 404 can then be employed to guide the light into directional light transmission device 406. The light is then directed into the polarizing drum 408 as polarizing drum 408 rotates about its central axis and the relay optics 410. Since each DMD/DLP imager set 424, 426, 428, and 430 must be supplied with light, the light exiting the light source 402 is separated into four channels of light (ideally identical in intensity and color) through the use of light beam splitting prisms as was similarly provided in system 300. A first light beam splitting prism 432 splits the original light beam 434 into two new light beams 436 and 438. Light beam 436 is directed from prism 432 into a second light beam splitting prism 440, resulting in light beams 442 and 444. Light beam 438 is directed from prism 432 into a third light beam splitting prism 446, resulting in light beams 448 and 450. Each of light beams 442, 444, 448, and 450 are directed into and delivered through optical fibers 452 to three color prisms 454 (substantially similar to three color prism 100) associated with DMD/DLP imager sets 424, 426, 428, and 430, respectively. The three color prisms 454 split the light beams into three primary color light beams (red, green, and blue). Further, three color prisms 454 receive light, direct the received light to DMD/DLP imagers 455, and finally output the light. However, it will be appreciated that in an alternative embodiment, the total internal reflection lens portion of the three color prisms 454 can be replaced by field lenses. Three color prisms 454 are oriented to direct their output into an arrangement of reflective prisms 456 and optical blocks 458 so as to forward the four light beams 442, 444, 448, and 450 (or channels of light) (as altered by DMD/DLP imager sets 424, 426, 428, and 430, respectively) into a projection optics system 460. Projection optics system 460 ultimately directs the light beams 442, 444, 448, and 450 onto regions 416, 418, 420, and 422, respectively, of the entire frame of the target display surface 414. The input signals sent from display controllers of DMD/DLP imager sets 424, 426, 428, and 430 to the mirrors of the respective DMD/DLP imagers comprise only the data necessary to create the desired image to be projected onto the associated regions of display surface 414. It will be appreciated that in other embodiments of the present invention, more or fewer DLP imagers can be incorporated to achieve a higher or lower overall projected image resolution, respectively. By incorporating DMD/DLP imager sets 424, 426, 428, and 430, so-called rainbow effects are avoided and a higher level of color control is achieved.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents. For example, light beam splitting prism can mean or be substituted with some other functional equivalent beam splitter means and optical fibers can mean or be substituted with some other functional equivalent beam propagating means.

In sum, the projector disclosed does directly address and solve industrial problems. They are that current DMD/DLP projectors have 2K×1K resolution which may not be suitable for most commercial theatres (especially at close viewing distances) and that meshing of pixels becomes evident when conventional projectors increase resolution to 4K×2K. The invention provides a single projector with a single light source (having 3D and 2D capability in a single projector) to provide large image resolution (especially for large images) without meshing of pixels.

The invention claimed is:
1. A projection system, comprising:
a light source for generating and emitting light;

a rotatable drum having differently polarizing sections arrranged for receiving the light and passing the light therethrough;

a first beam splitter for splitting the light into first and second light beams;

a second beam splitter for splitting the first light beam into third and fourth beams;

a third beam splitter for splitting the second light beam into fifth and sixth light beams;

a first imager configured to receive and reflect at least some portion of the third light beam;

a second imager configured to receive and reflect at least some portion of the fourth light beam;

a third imager configured to receive and reflect at least some portion of the fifth light beam; and a fourth imager configured to receive and reflect at least some portion of the sixth light beam;

wherein the imagers are configured to project to different portions of a display surface.

2. The projection system according to claim 1, wherein the imagers are microdisplay devices.

3. The projection system according to claim 1, wherein the imagers have a resolution of about 2K×1K pixels.

4. The projection system according to claim 1, wherein the imagers are configured to display an equal area of an entire frame of a motion picture image onto the display surface.

5. The projection system according to claim 1, further comprising:

a total internal reflection lens optically disposed between the light source and at least one of the imagers.

6. The projection system according to claim 5, further comprising:

a projection optics system optically disposed between the total internal reflection lens and the display surface.

7. The projection system according to claim 1, wherein the beam splitters are light beam splitting prisms.

8. The projection system according to claim 7, wherein the imagers manipulate a received beam of light to carry motion picture image data corresponding to only a discrete portion of an entire motion picture image frame.

9. The projection system according to claim 1, the drum further comprising:

differently colored sections.

10. The projection system according to claim 1, further comprising:

a plurality of three color prisms for separating the light into three primary color light beams.

11. The projection system according to claim 10, wherein at least one of the three color prisms separates the third beam into the three primary color light beams that are separately directed to different imagers, wherein different imagers are the first imager, a fifth imager, and sixth imager.

12. The projection system according to claim 1, wherein the light beam is passed through the wall of the drum as the drum is rotated about a central axis of the drum.

13. A method for projecting images, comprising the steps of:

polarizing a source light beam into first and second light beams having different polarizations and alternating polarities relative to one another;

rotatably controlling said polarizing step;

splitting the first and second polarized light beams into a plurality of separate channels of light that each have respective third and fourth differently polarized light beams;

dividing each said channel of said respective third and fourth light beams into respective sets of differently colored light beams, illuminating respective imagers with said respective sets of differently colored light beams; and, illuminating different regions of a display with said respective imagers.

14. The method of claim 13, wherein the rotatably controlling step comprises the steps of:

defining an annular path having an inwardly directed surface, radii of said annular path intersecting said surface in a substantially perpendicular manner;

defining a polarizing position on said annular path;

directing said source light beam toward said polarizing position on said annular path; and, rotatably controlling movement along said annular path.

15. The method of claim 13, comprising the step of reflecting said differently colored light beams between said illuminating steps.

16. A method of projecting images comprising the steps of:

generating a light beam;

filtering the light into separate colors of light;

polarizing the light beam to create first polarized portion and second polarized portion, the first and second polarized portion having different polarizations;

splitting the light beam into first and second light beams;

splitting the first light beam into third and fourth light beams;

splitting the second light beam into fifth and sixth light beams;

directing third, fourth, fifth and sixth light beams to different imagers; and projecting light from the different imagers to different and separate regions of a display surface.

17. The method of claim 16, wherein a rotatable drum having differently polarized sections is used in the polarizing step to polarize the light beam.

18. The method of claim 16, wherein the imagers are microdisplay devices.

* * * * *